(12) United States Patent
Dague et al.

(10) Patent No.: US 8,414,011 B2
(45) Date of Patent: Apr. 9, 2013

(54) HITCH ASSEMBLY

(75) Inventors: Daniel Dague, Newport, MI (US); Anthony S. Hughes, Chesterfield, MI (US)

(73) Assignee: Midway Products Group, Inc., Monroe, MI (US)

( * ) Notice: Subject to any disclaimer, the term of this patent is extended or adjusted under 35 U.S.C. 154(b) by 84 days.

(21) Appl. No.: 13/018,488

(22) Filed: Feb. 1, 2011

(65) Prior Publication Data

US 2011/0272919 A1 Nov. 10, 2011

Related U.S. Application Data

(60) Provisional application No. 61/300,850, filed on Feb. 3, 2010.

(51) Int. Cl.
*B60R 19/48* (2006.01)
(52) U.S. Cl. ..... 280/500; 280/495; 280/497; 280/491.1; 280/491.2
(58) Field of Classification Search ............... 280/500, 280/495, 497, 491.1, 491.2
See application file for complete search history.

(56) References Cited

U.S. PATENT DOCUMENTS

| | | | |
|---|---|---|---|
| 2,665,923 A | 1/1954 | Perry | |
| 3,618,835 A | 11/1971 | Terry et al. | |
| 4,022,490 A * | 5/1977 | Rocksvold | 280/500 |
| 4,951,957 A | 8/1990 | Gullickson | |
| 6,318,748 B1 * | 11/2001 | Hery | 280/500 |
| 6,402,179 B1 * | 6/2002 | Morris et al. | 280/495 |
| 6,511,090 B2 | 1/2003 | Quanbeck et al. | |
| 6,739,613 B2 * | 5/2004 | Aquinto et al. | 280/500 |
| 6,969,084 B2 * | 11/2005 | Kaepp et al. | 280/500 |
| 6,979,016 B1 * | 12/2005 | Wegener | 280/505 |
| 7,425,014 B1 * | 9/2008 | Palmer | 280/479.3 |
| 7,971,896 B2 * | 7/2011 | Hughes et al. | 280/495 |

OTHER PUBLICATIONS

International Search Report, Apr. 28, 2011.

* cited by examiner

*Primary Examiner* — Tashiana Adams
*Assistant Examiner* — Marlon Arce
(74) *Attorney, Agent, or Firm* — Barnes & Thornburg LLP

(57) ABSTRACT

A hitch assembly for attachment to a bumper beam that is concealed with a bumper fascia. In one embodiment, the hitch assembly includes a body extending through the bumper fascia and has a receiver dimensioned to receive a drawbar. To secure the drawbar to the hitch assembly, at least one pin may be provided that can move between an engaged position that secures the drawbar to the hitch assembly and a disengaged position that allows the drawbar to be released from the hitch assembly. The hitch assembly may also include a handle extending from the bumper fascia and adapted to move the pin between the engaged position and the disengaged position.

24 Claims, 17 Drawing Sheets

HITCH ASSEMBLY

RELATED APPLICATION

This application claims the benefit of U.S. Provisional Application No. 61/300,850 filed Feb. 3, 2010, the entire disclosure of which is hereby incorporated by reference.

TECHNICAL FIELD

The present invention relates generally to hitch assemblies; in particular, the invention relates to a hitch assembly that may be self pinning.

BACKGROUND

Trailer hitches are well known devices that are used to tow trailers, hitch-mounted bike racks, and other hitch-mounted accessories. Hitches are often installed with a receiver that extends below the bumper fascia. Extending the hitch below the bumper fascia, however, has a tendency to reduce the structural strength of the hitch. Vehicle manufacturers also provide hitches that extend through a cutout in the bumper fascia. Although these hitches tend to have increased structural strength, the large cutout in the fascia can be unsightly.

SUMMARY

According to one aspect, the invention provides a bumper assembly. The bumper assembly includes a bumper beam for an automotive vehicle and a bumper fascia that covers the bumper beam. A hitch assembly is attached to the bumper beam. In one embodiment, the hitch assembly includes a body extending through the bumper fascia and dimensioned to receive a drawbar. One or more pins may be provided to move between an engaged position that secures the drawbar to the hitch assembly and a disengaged position that allows the drawbar to be released from the hitch assembly. Typically, the hitch assembly includes a handle extending from the bumper fascia and adapted to move the pin between the engaged position and the disengaged position. Embodiments are contemplated in which the hitch assembly includes a receiver dimensioned to receive a drawbar and the pins extend through the receiver to engage the drawbar. In one embodiment, the pins move laterally between the engaged position and the disengaged position. For example, the body could include a cam surface that moves the pin between the engaged position and the disengaged position.

According to another aspect, the invention provides a hitch assembly for attachment to a bumper beam that is concealed with a bumper fascia. The hitch assembly includes a body extending through the bumper fascia and has a receiver dimensioned to receive a drawbar. To secure the drawbar to the hitch assembly, at least one pin may be provided that can move between an engaged position that secures the drawbar to the hitch assembly and a disengaged position that allows the drawbar to be released from the hitch assembly. The hitch assembly may also include a handle extending from the bumper fascia and adapted to move the pin between the engaged position and the disengaged position.

In one embodiment, the receiver defines openings in opposing sidewalls through which a first pin and a second pin moveable in and out of registry. For example, the first pin and the second pin could move in a coplanar manner. Embodiments are contemplated in which the hitch assembly includes a first lever pivotable about a first bushing and a second lever pivotable about a second bushing. The first lever and second lever move the first pin and second pin, respectively, in and out of registry with an opening in the sidewall of the receiver. For example, the first lever may include a cam that is configured to engage a surface on the second lever, such that the cam is configured to actuate rotation of the second lever about the second bushing when the first lever pivots about the first bushing.

In another embodiment, the hitch assembly includes a first plate and second plate configured to move the first pin and the second pin in and out of registry with the openings in the sidewalls of the receiver. For example, the first pin and the second pin may have a first cam surface adapted to engage an edge of the first plate to move the first pin and the second pin out of registry with the openings in the side walls of the receiver. The first pin and the second pin could also have a second cam surface adapted to engage an edge of the second plate to move the first pin and the second pin in registry with the openings in the side walls of the receiver.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which.

Figure 1:
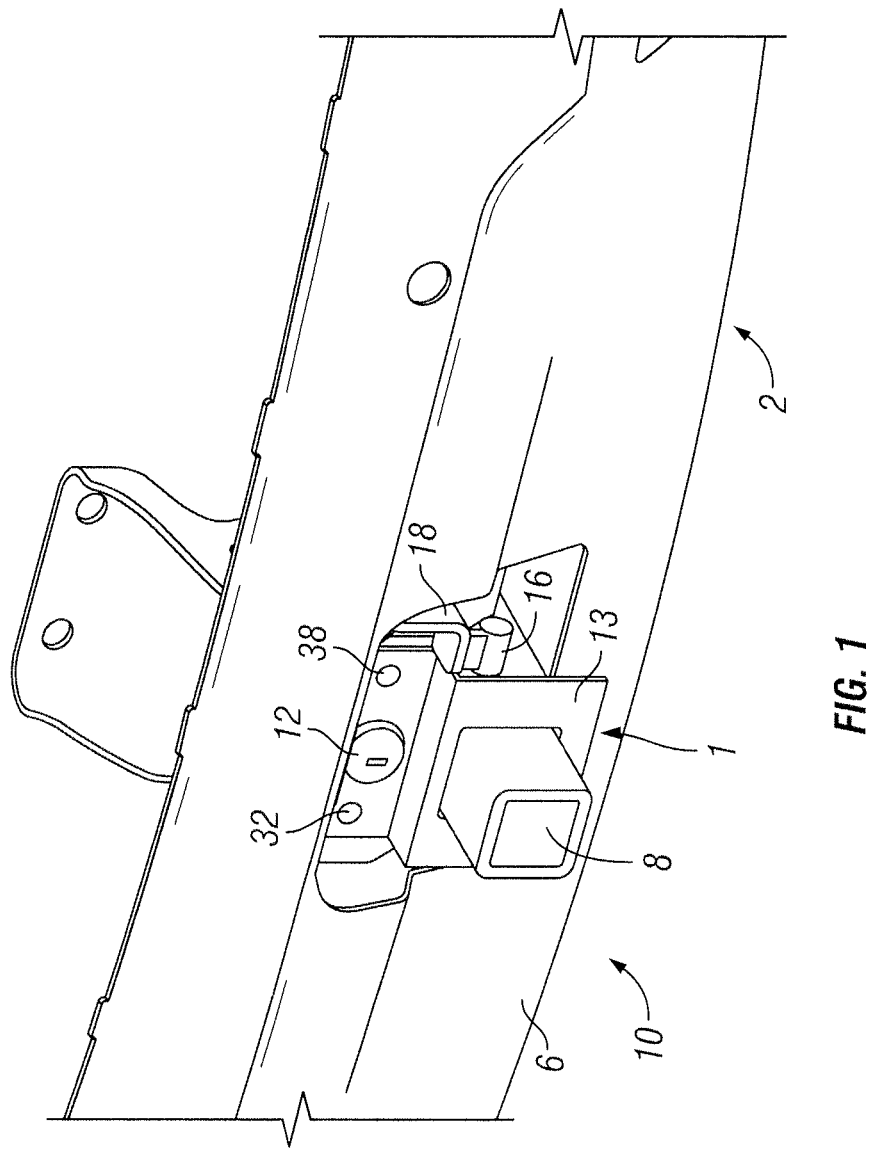
FIG. 1 is a perspective view of a vehicle bumper with an example hitch assembly according to a first embodiment of the present invention.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

FIG. 1 shows a rear portion of a vehicle with a bumper 2. Typically, the bumper 2 includes a structural support, such as a bumper beam 4 (see FIG. 2) and a bumper fascia 6. In the embodiment shown in FIG. 1, a hitch assembly 10 extends through the bumper fascia 6 so that a drawbar 8 may be coupled with the hitch assembly 10. One skilled in the art should appreciate that the drawbar 8 may have a variety of shapes and/or sizes depending on the size and type of device that is intended to be coupled to the hitch assembly 10. In the example shown, the hitch assembly 10 includes a lock 12 for preventing release of the drawbar 8 from the hitch assembly 10.

Figure 2:
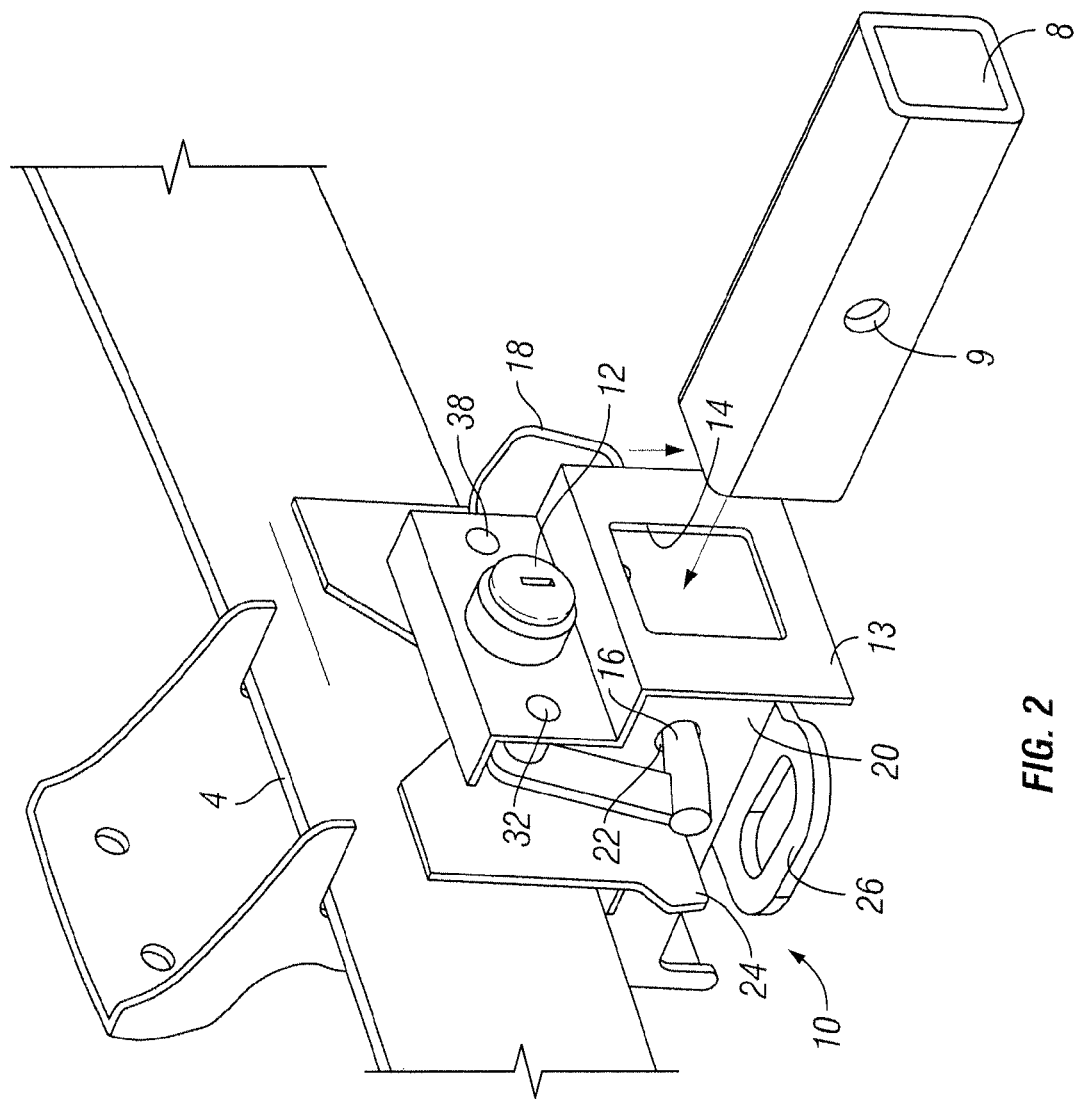
FIG. 2 is a perspective view of the example hitch assembly of FIG. 1 in an open position so a drawbar may be inserted.

FIG. 2 shows the example hitch assembly 10 of FIG. 1 with the bumper fascia 6 removed. As shown, the hitch assembly 10 includes a body 13 that defines an opening 14 which is dimensioned to receive the drawbar 8. In this example, the drawbar 8 includes holes 9 that may be engaged by pins 16 to secure the drawbar 8 to the hitch assembly 10. As shown, the hitch assembly 10 includes a handle 18 for actuating the opening/closing movement of the pins 16. In this example, the user moves the handle 18 downward to move the pins to an open position that allows the drawbar to be inserted/removed from the hitch assembly 10. When the handle 18 is released, the pins 16 move to a closed position, in which the pins 16 engage the holes 9 in the drawbar 8. Although the handle 18 has a downward movement to open/close the pins in the example shown, it should be appreciated that other types of movements or mechanisms could be used.

In this example, the body 13 is coupled to a receiver 20 that is dimensioned to receive the drawbar 8. As shown, the receiver 20 includes holes 22 that are dimensioned to receive the pins 16. In this example, the pins 16 pass through the holes 22 in the receiver 20 to engage the holes 9 in the drawbar 8. In the embodiment shown, the hitch assembly 10 includes a frame 24 for attaching the receiver 20 to the bumper beam 4. As shown, the hitch assembly 10 includes attachment plates 26 for attaching safety chains (not shown) to the hitch assembly 10.

Figure 3:
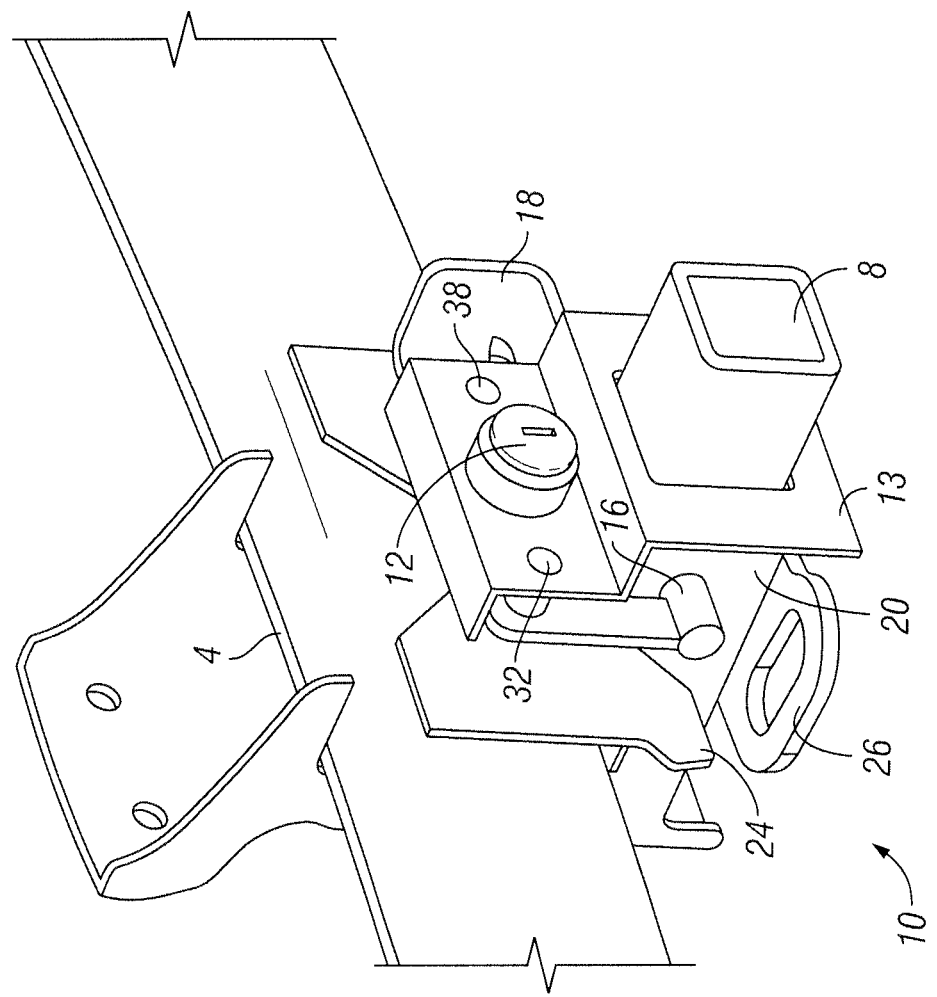
FIGS. 3-5 are perspective views of the example hitch assembly of FIG. 1 in a closed position so the drawbar is locked in place.
Figure 4:
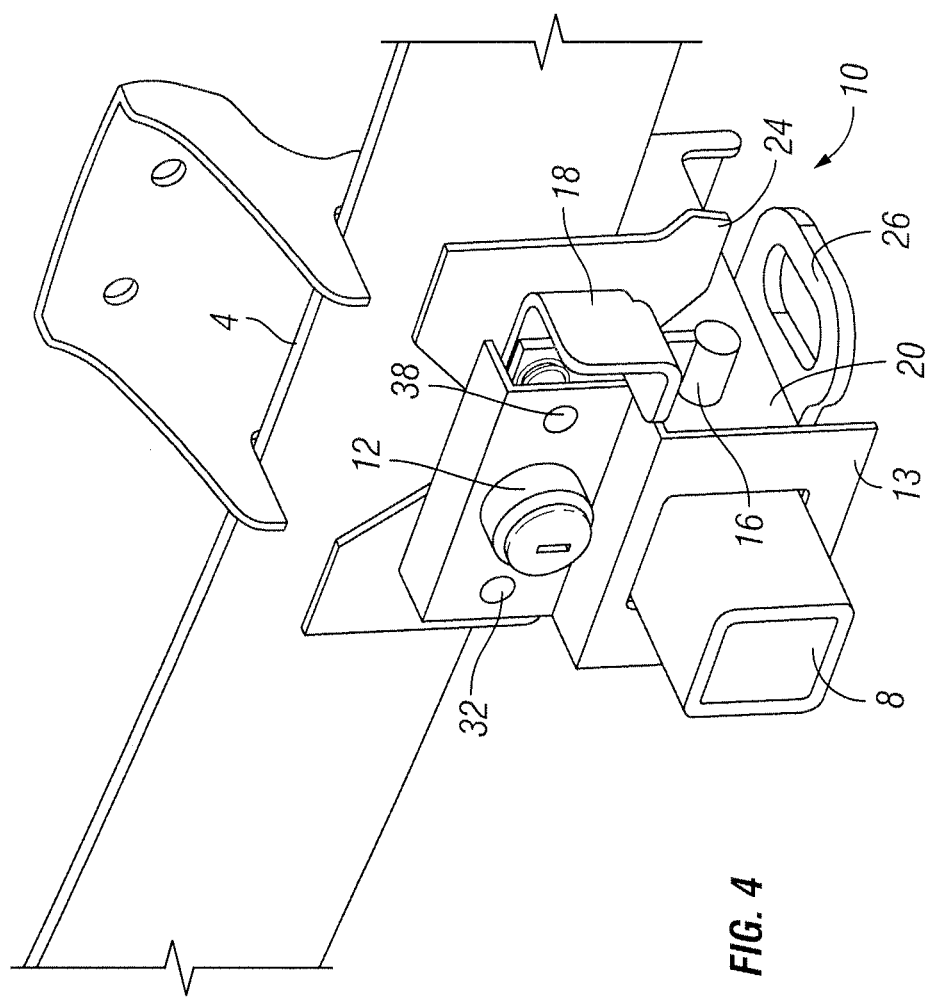
Figure 5:
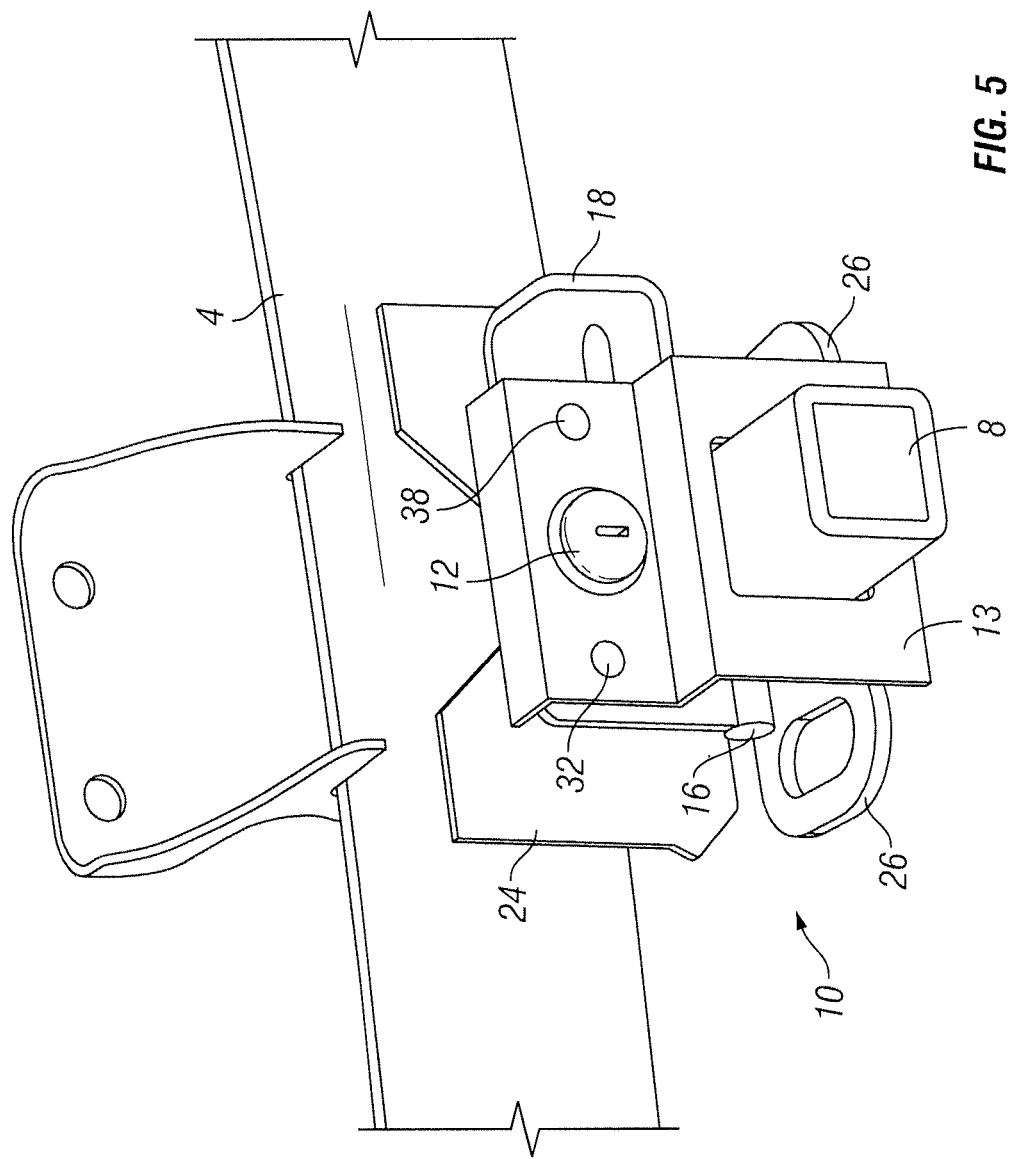
Figure 6:
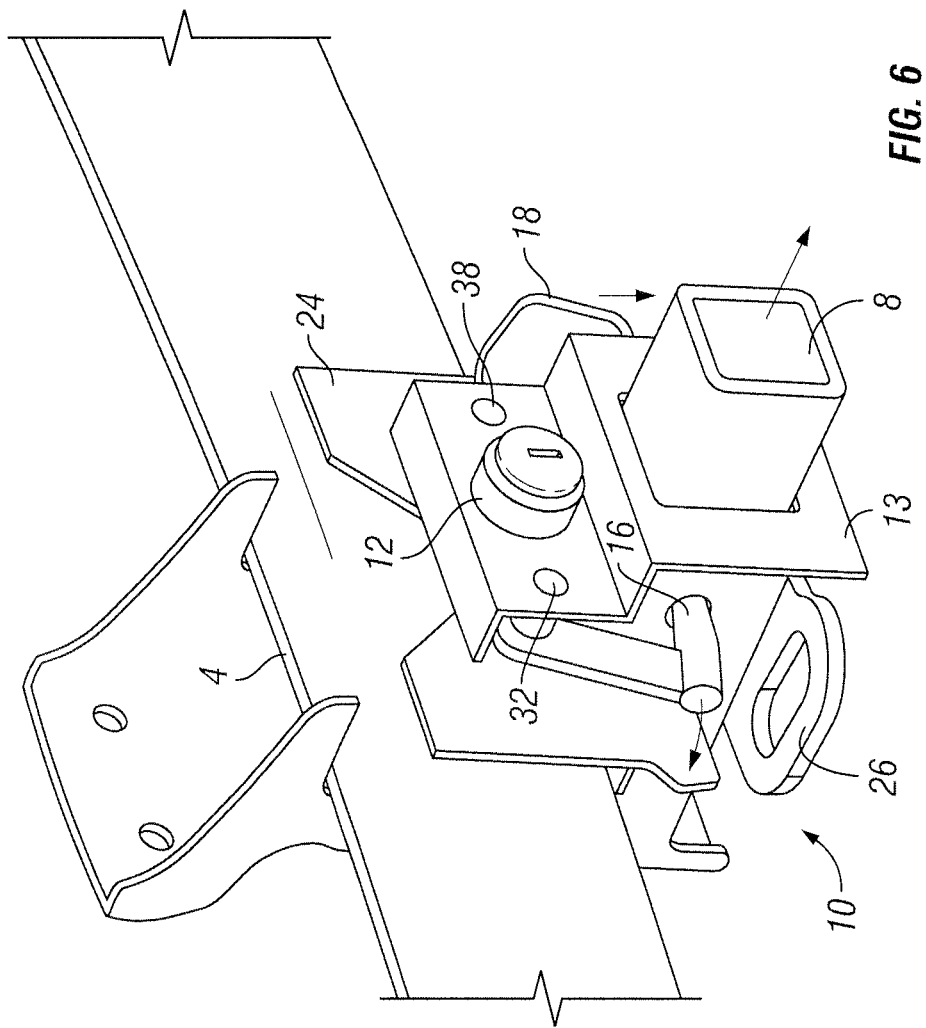
FIG. 6 is a perspective view of the example hitch assembly of FIG. 1 in an open position so the drawbar may be removed.

FIGS. 3-5 show the example hitch assembly 10 in a closed position, in which the pins 16 engage the holes 9 of the drawbar 8 to secure the drawbar 8 to the hitch assembly 10. The lock 12 may be moved to a locked position, which prevents actuation of the handle 18 to prevent release of the drawbar 8. When the drawbar 8 is to be released, the lock 12 may be moved to an unlocked position, which allows actuation of the handle 18 to release the drawbar 8. FIG. 6 shows the hitch assembly 10 with the handle 18 actuated, which disengages the pins 16 from the holes 9 in the drawbar 8; this allows the drawbar 8 to be removed from the hitch assembly 10.

Figure 7:
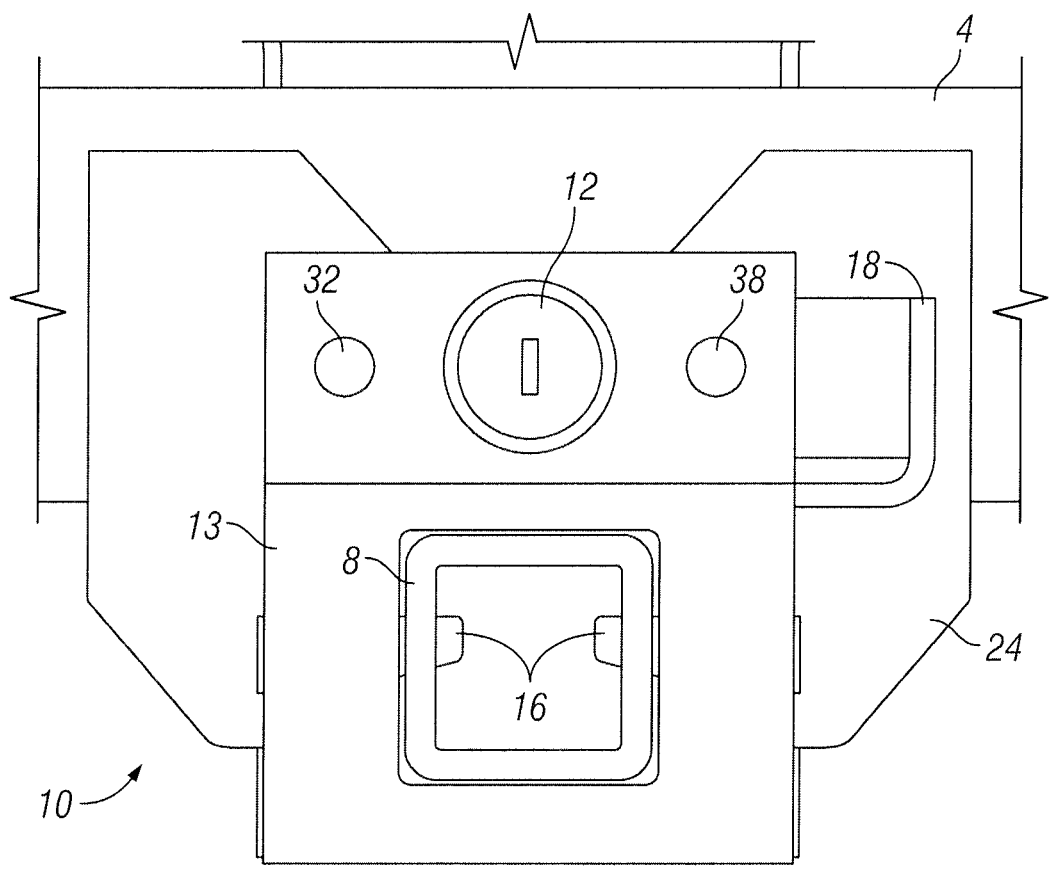
FIG. 7 is a front view of the example hitch assembly of FIG. 1 in a closed position.
Figure 8:
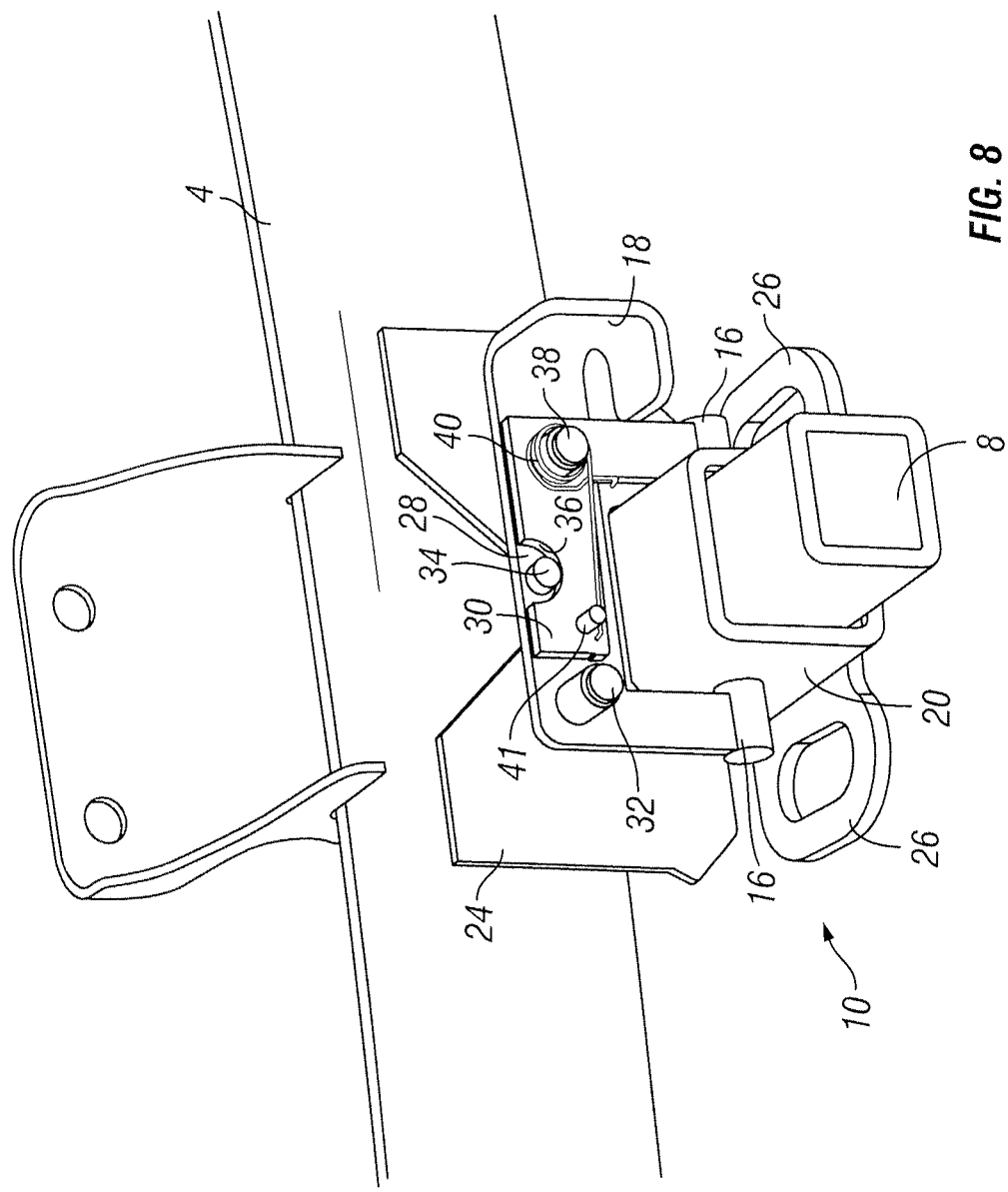
FIG. 8 is a perspective view of the example hitch assembly of FIG. 7 with the body removed to show internal components.

Referring to FIGS. 7 and 8, the example hitch assembly 10 is shown in a closed position with the drawbar secured by the pins 16. In FIG. 8, the body 13 has been removed to show internal components of the hitch assembly 10. In the embodiment shown, the hitch assembly 10 may include a first lever 28 and a second lever 30. As shown, the first lever 28 pivots about a first bushing 32 that is attached to the body 13. In this embodiment, actuating the handle 18 rotates the first lever 28 about the first bushing 32, which moves the pin 16 on the first lever 28 in/out of a hole 9 in the drawbar 8. As shown, the first lever 28 includes a cam 34 that actuates the second lever 30. In the example shown, the cam 34 actuates the second lever 30 via a cam surface 36, which pivots the second lever 30 about a second bushing 38. Accordingly, the pivoting movement of the second lever 30 moves the pin 16 on the second lever 28 in/out of a hole 9 in the drawbar 8. As shown, a biasing member 40 is provided for engaging a peg 41 on the second lever 30, which urges the pins 16 to a closed position.

Figure 9:
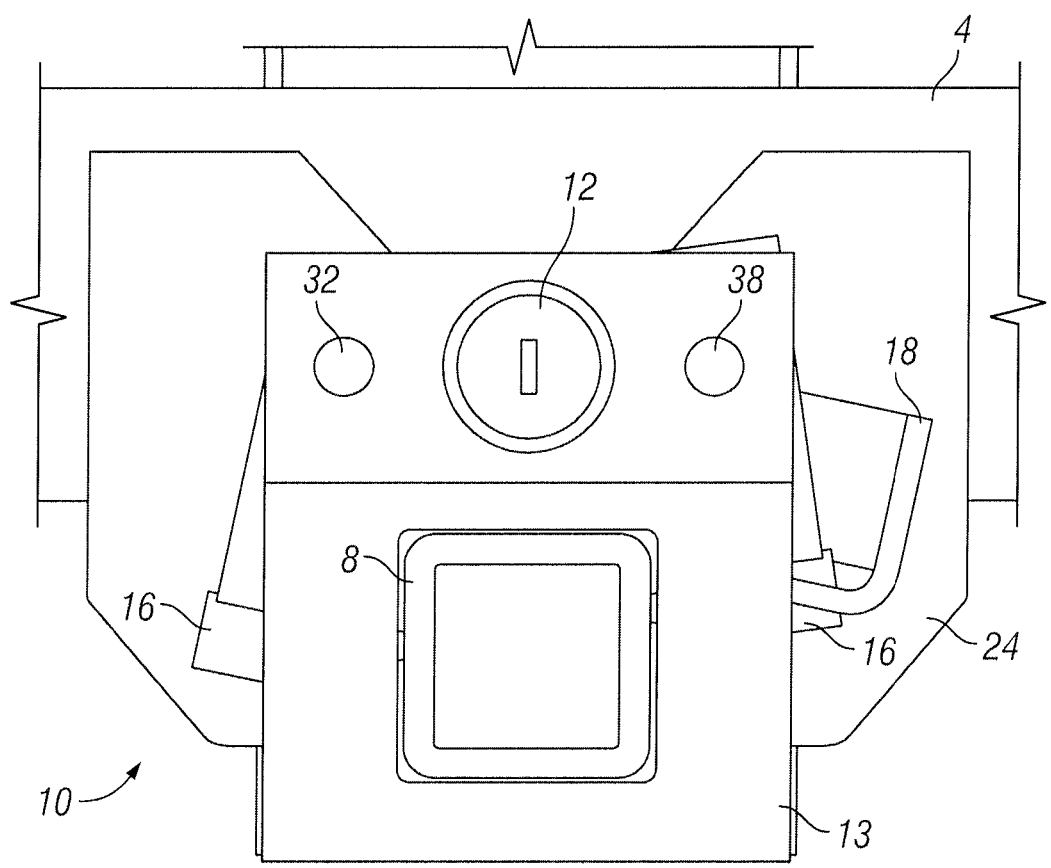
FIG. 9 is a front view of the example hitch assembly of FIG. 1 in an open position.
Figure 10:
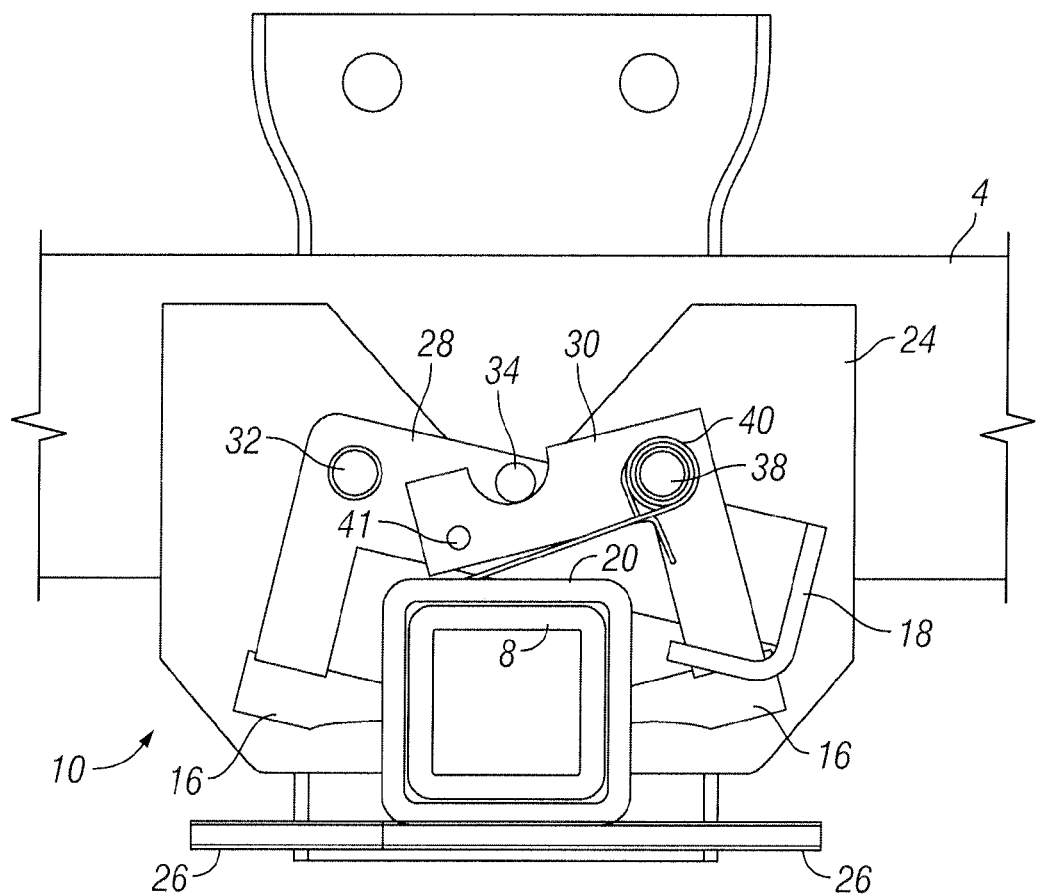
FIG. 10 is a front view of the example hitch assembly of FIG. 9 with the body removed to show internal components.
Figure 11:
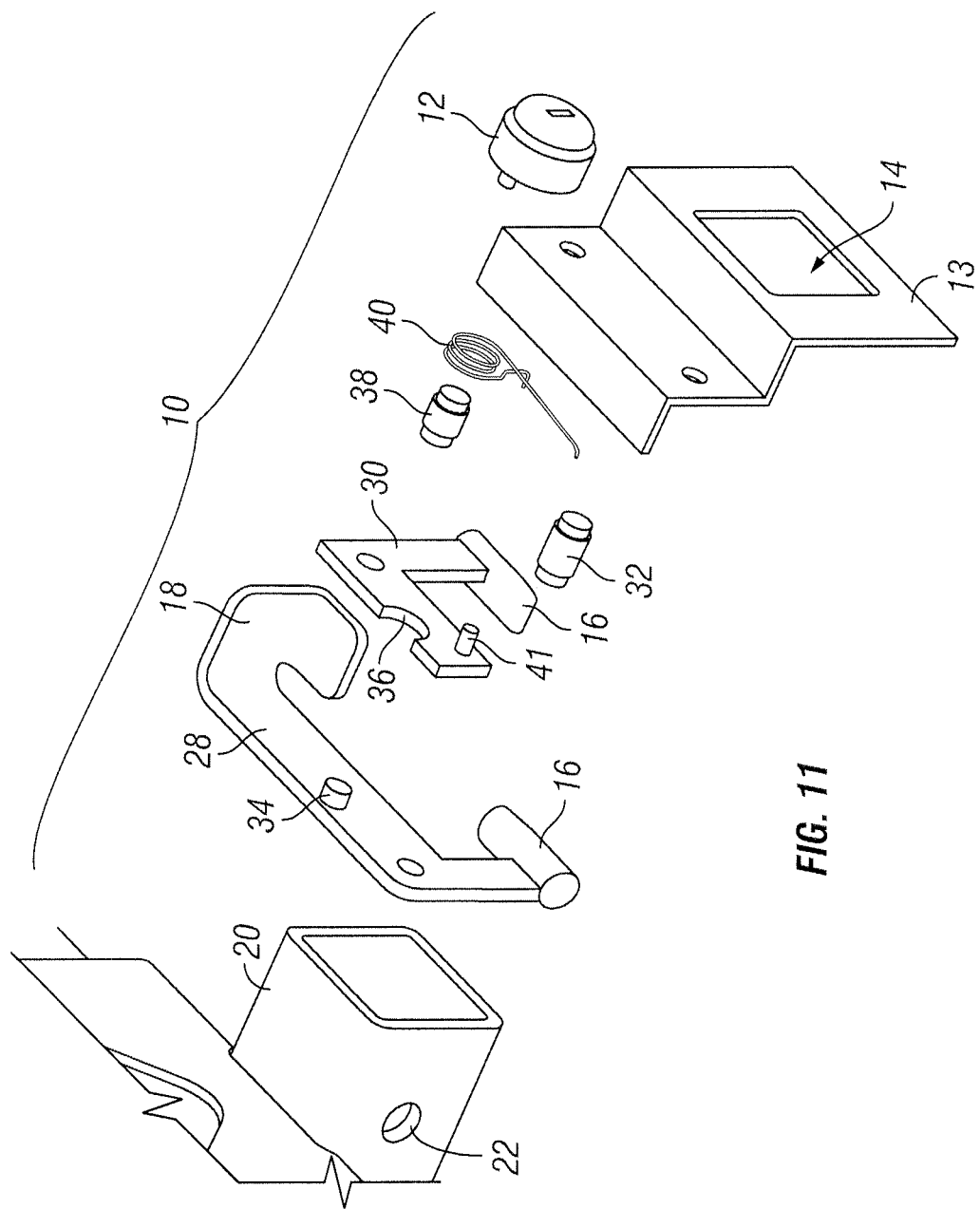
FIG. 11 is an exploded view of the example hitch of FIG. 1.
Figure 12:
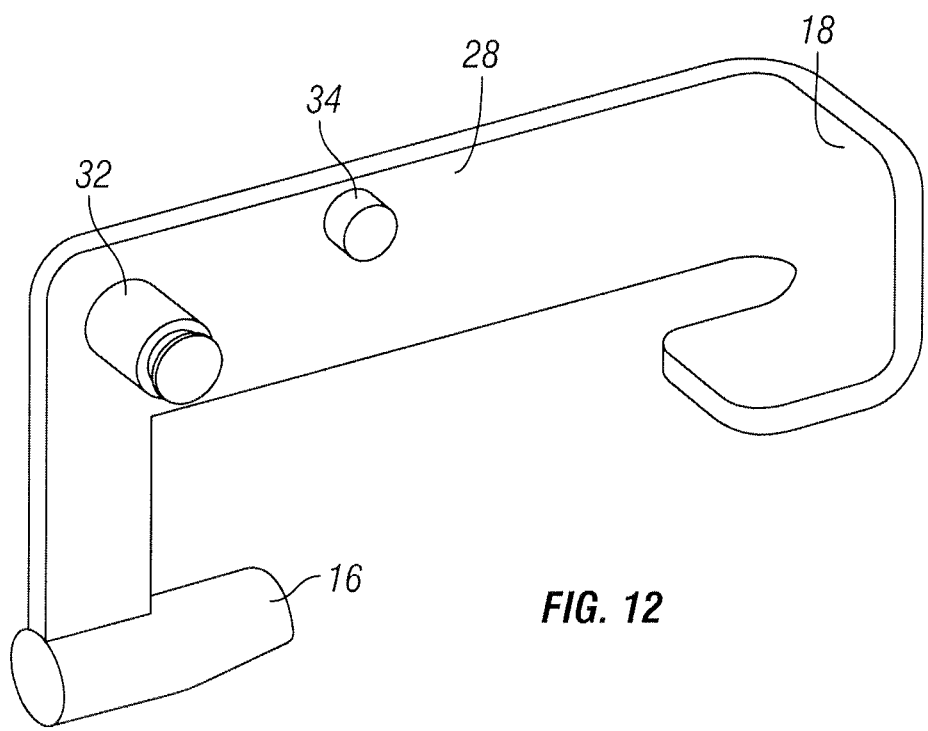
FIG. 12 is a perspective view of an example first lever according to an embodiment of the present invention.
Figure 13:
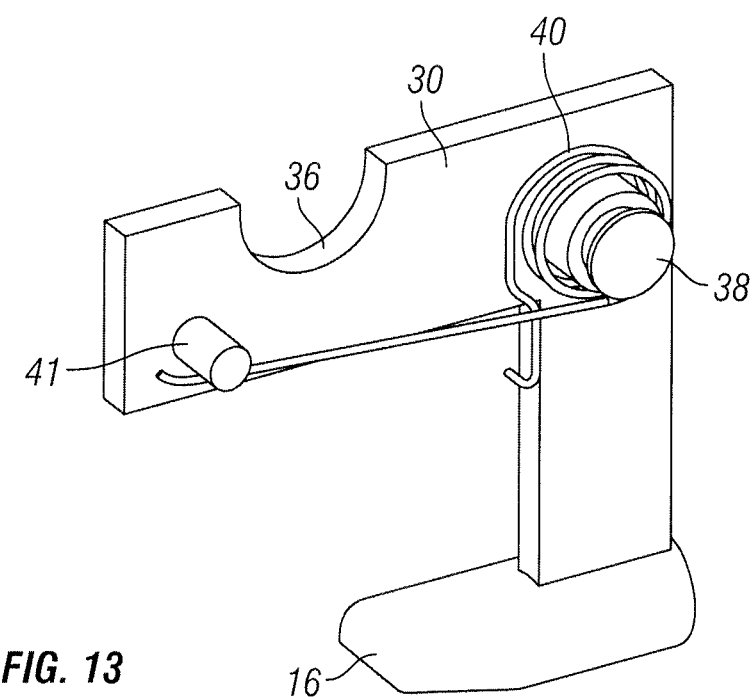
FIG. 13 is a perspective view of an example second lever according to an embodiment of the present invention.

FIGS. 9 and 10 show the example hitch assembly 10 in an open position with the handle 18 actuated to disengage the pins 16 from the holes 9 in the drawbar 8. FIG. 11 shows the example hitch assembly 10 in an exploded view. FIGS. 12 and 13 show example embodiments of the first lever 28 and the second lever 30, respectively.

During operation, the user would move the lock 12 to an unlocked position. The handle 18 would be actuated to move the pins 16 to an open position so the drawbar 8 may be inserted into the receiver 20. As discussed above, actuation of the handle 18 pivots the first lever 28 about the first bushing 32. This moves the pin 16 on the first lever 28 to an open position. The pivoting of the first lever 28 also causes the cam 34 to ride along cam surface 36, which pivots the second lever 30 about the second bushing 38. This movement of the second lever 30 moves the pin 16 on the second lever 30 to an open position. When the handle 18 is released, the biasing member 40 urges the second lever 30 to a closed position. Due to the movement of the cam surface 36, this also causes the first lever 28 to be urged back to the closed position. In the closed position, the pins 16 engage the holes 9 in the drawbar 8 to prevent removal of the drawbar 8. The lock 12 may be moved to a locked position, which prevents actuation of the handle 18. When the drawbar 8 is to be removed, the lock 12 may be moved to an unlocked position. The handle 18 could then be actuated to disengage the pins 16 from the drawbar 8 so it can be removed.

Figure 14:
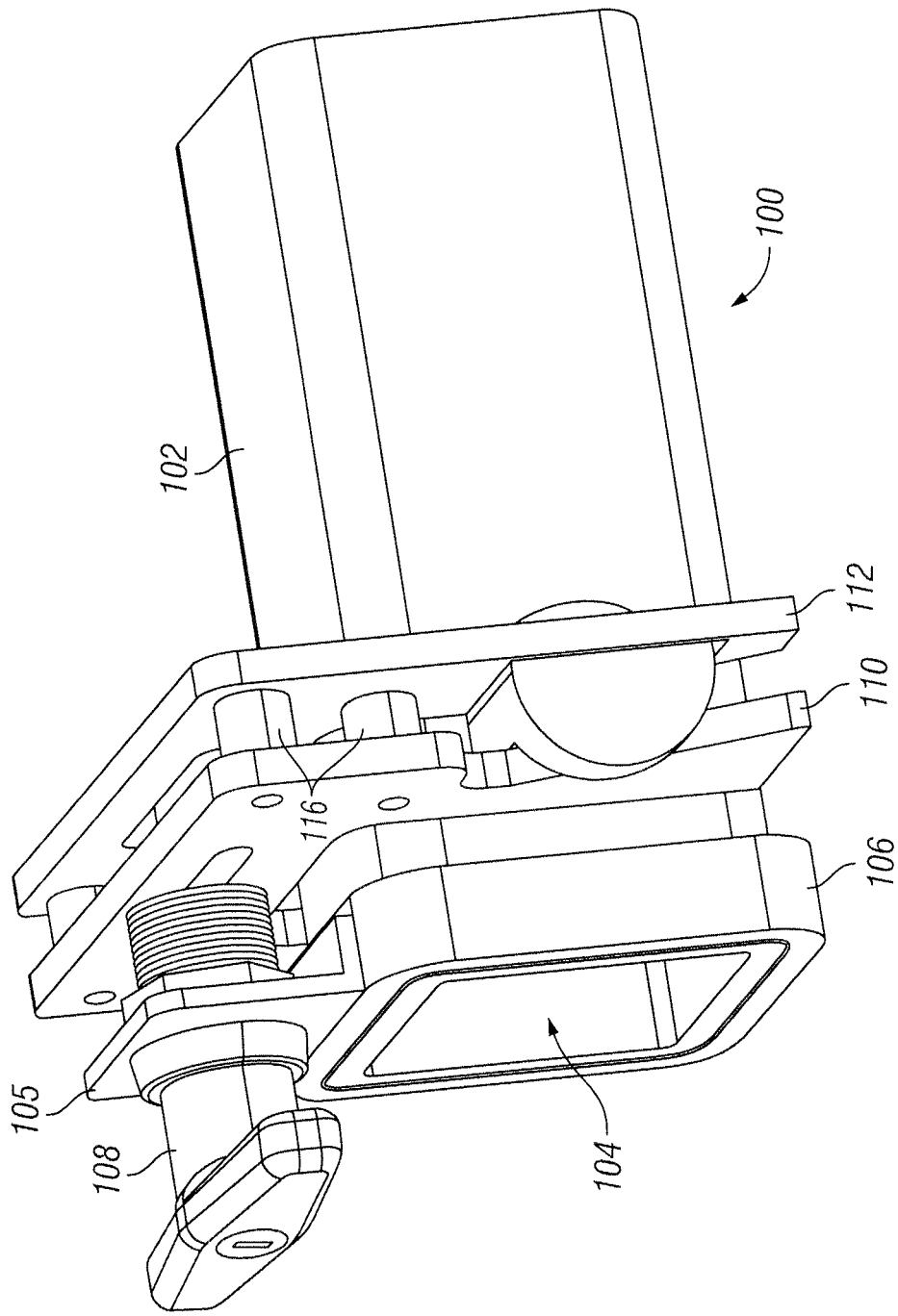
FIG. 14 is a perspective view of an example hitch assembly according to a second embodiment of the present invention.

FIGS. 14-19 show a hitch assembly 100 according to another embodiment. As shown in FIG. 14, this embodiment includes a receiver 102 with an opening 104 for receiving the drawbar 8. In the embodiment shown, a bracket 105 extends from a mounting member 106 that is attached to the receiver 102 for attachment of a handle 108. The handle 108 is configured to actuate movement of a first plate 110 and a second plate 112. In this embodiment, the handle actuates approximately vertical movement of the plates 110, 112 between an open position and a closed position. One skilled in the art should recognize that there are a variety of mechanisms that could actuate the plates in this manner.

The movement of the plates 110, 112 between the open position and the closed position moves pins 114 in/out of registry with the holes 9 in the drawbar 8. In the embodiment shown, the plates 110, 112 include cams that move the pins 114 between an open/closed position. As shown, spacers 116 are provided to maintain a predetermined distance between the plates 110, 112.

Figure 15:
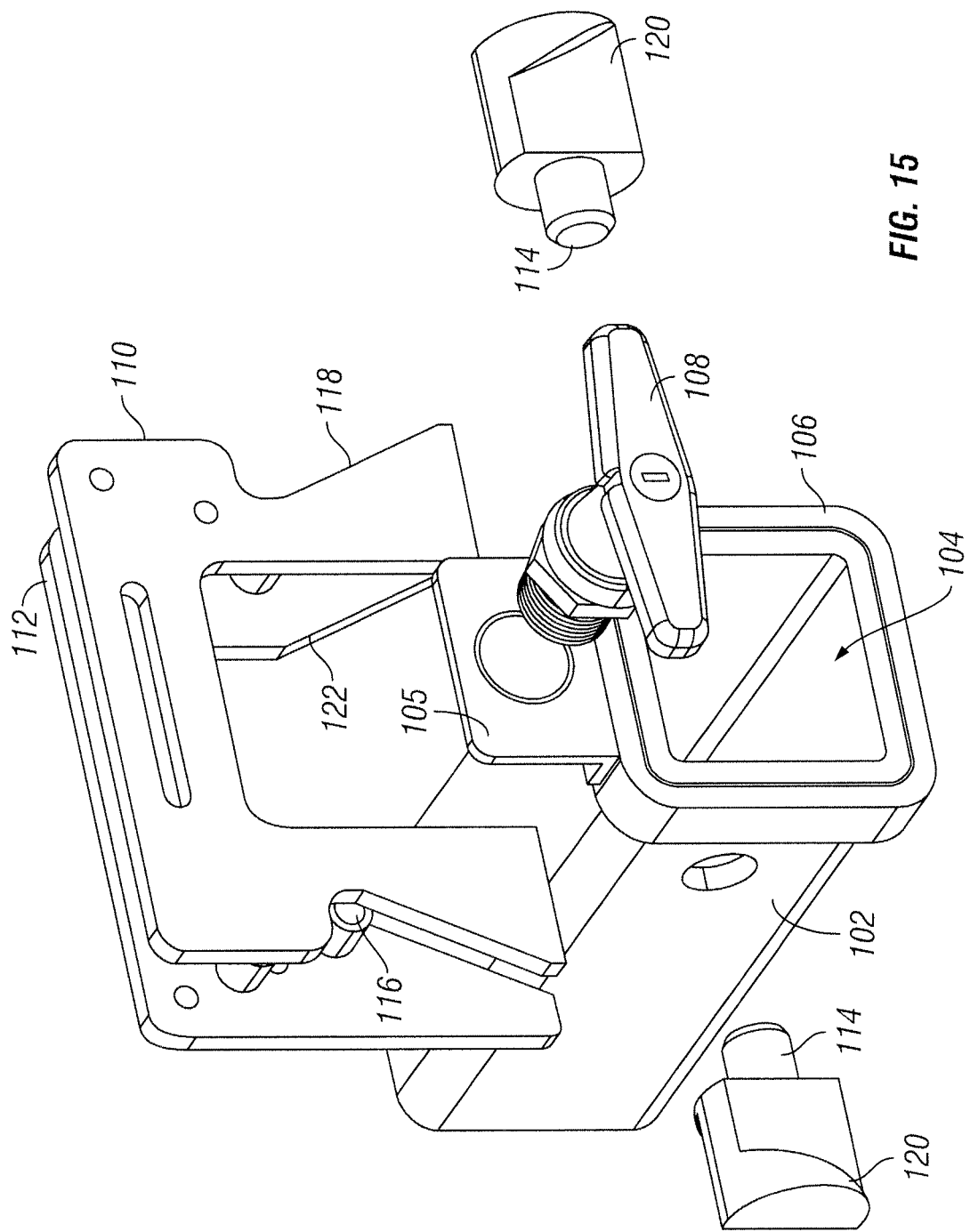
FIG. 15 is an exploded view of the example hitch assembly shown in FIG. 14.

FIG. 15 shows an exploded view of the example hitch assembly 100. As shown, the first plate 110 includes an opening cam surface 118 that engages a surface 120 on a first side (the front side as shown in FIG. 15) of the pins 114. With the embodiment shown, vertical movement of the first plate 110 (upward in this example) will cause a lateral movement of the pins 114 outward to disengage the holes 9 in the drawbar 8. The second plate 112 includes a closing cam surface 122 that engages a surface 124 (see FIG. 17) on a second side (the rear side as shown in FIG. 15) of the pins 114. As shown, vertical movement (downward in this example) of the second plate 112 will cause a lateral movement of the pins 114 inward to engage the holes 9 in the drawbar 8. Although the plates 110, 112 move in unison in the example shown, one skilled in the art should appreciate that the plates 110, 112 could move independently.

Figure 16:
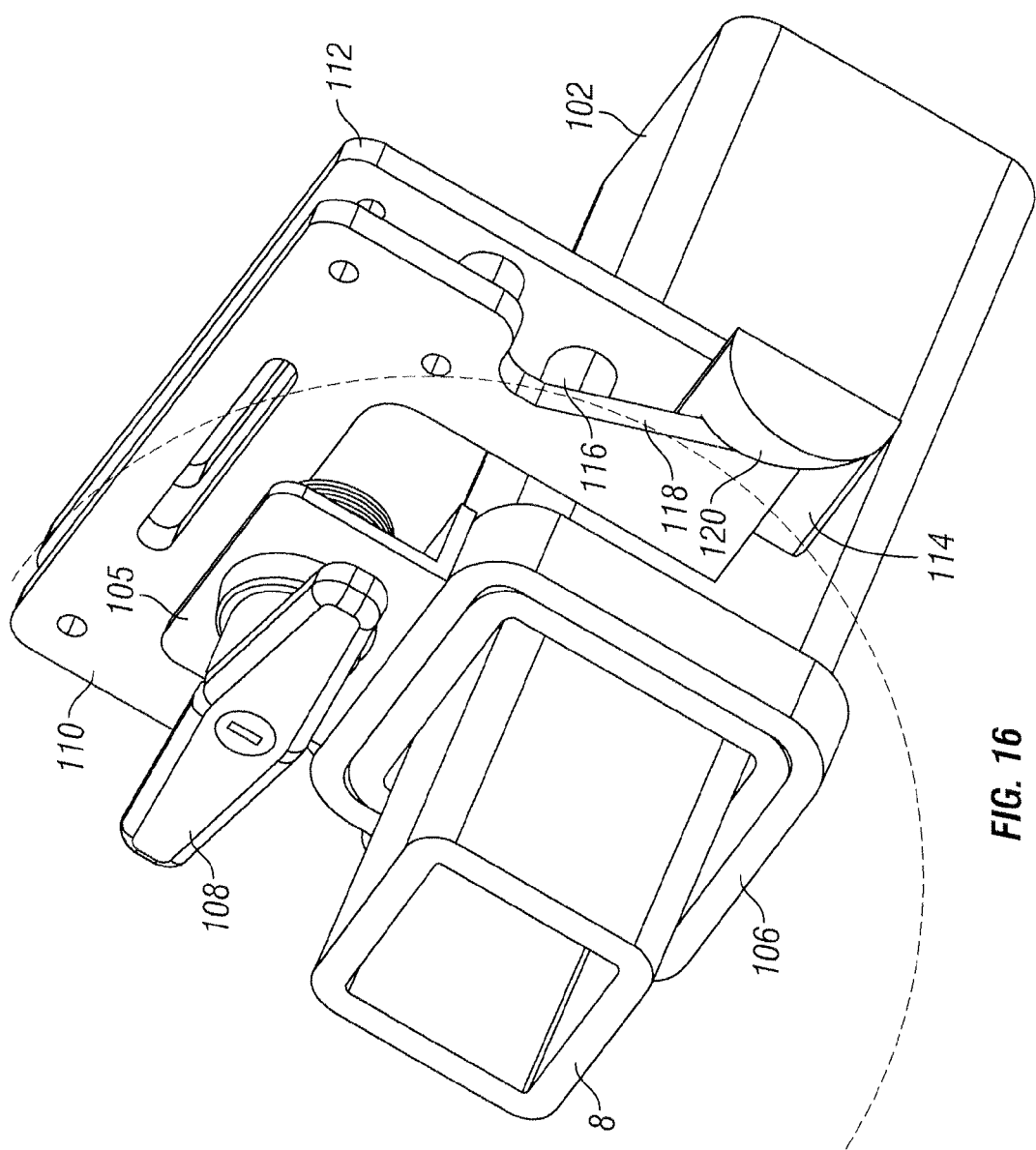
FIG. 16 is a front perspective view of the example hitch assembly shown in FIG. 14 in an open position.
Figure 18:
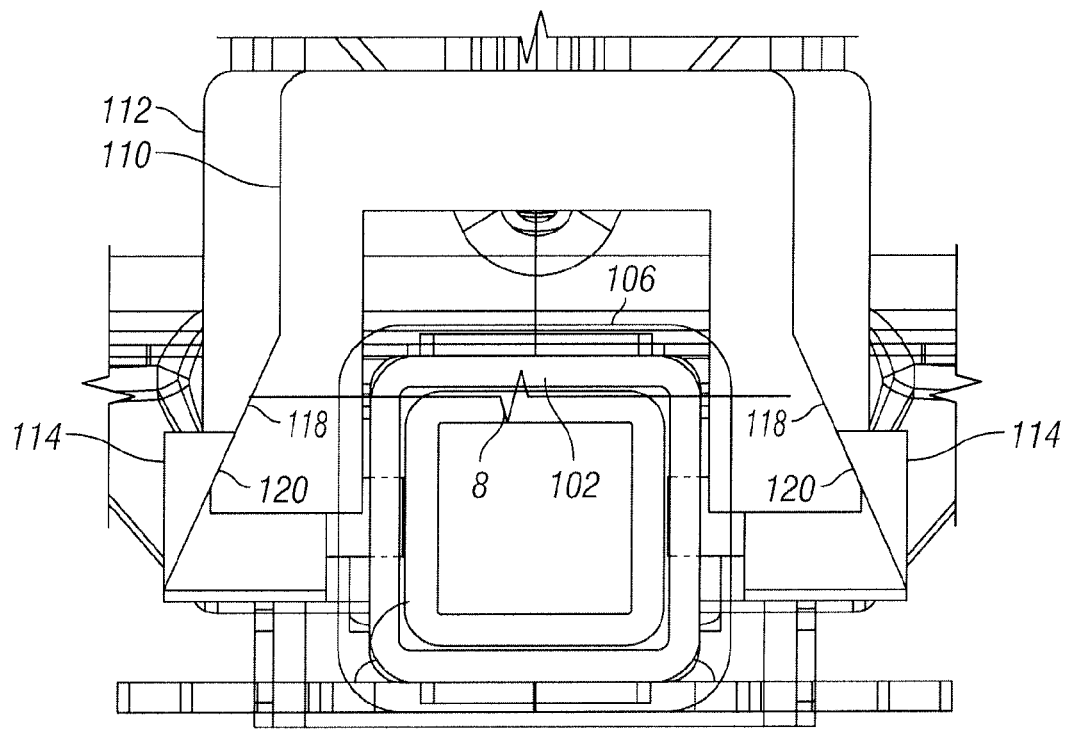
FIG. 18 is a front view of the example hitch assembly shown in FIG. 14 in an open position.

FIGS. 16 and 18 show the example hitch assembly 100 in an open position for insertion/removal of the drawbar 8. As discussed above, in this embodiment, the hitch assembly 100 is in an open position when the plates 112 are moved vertically (upward in this example) so that opening cam surface 118 on the first plate 110 acts on the surface 120 on the first side (front side in this example) of the pins 114 to cause outward movement to disengage from the holes 9 in the drawbar 8.

Figure 17:
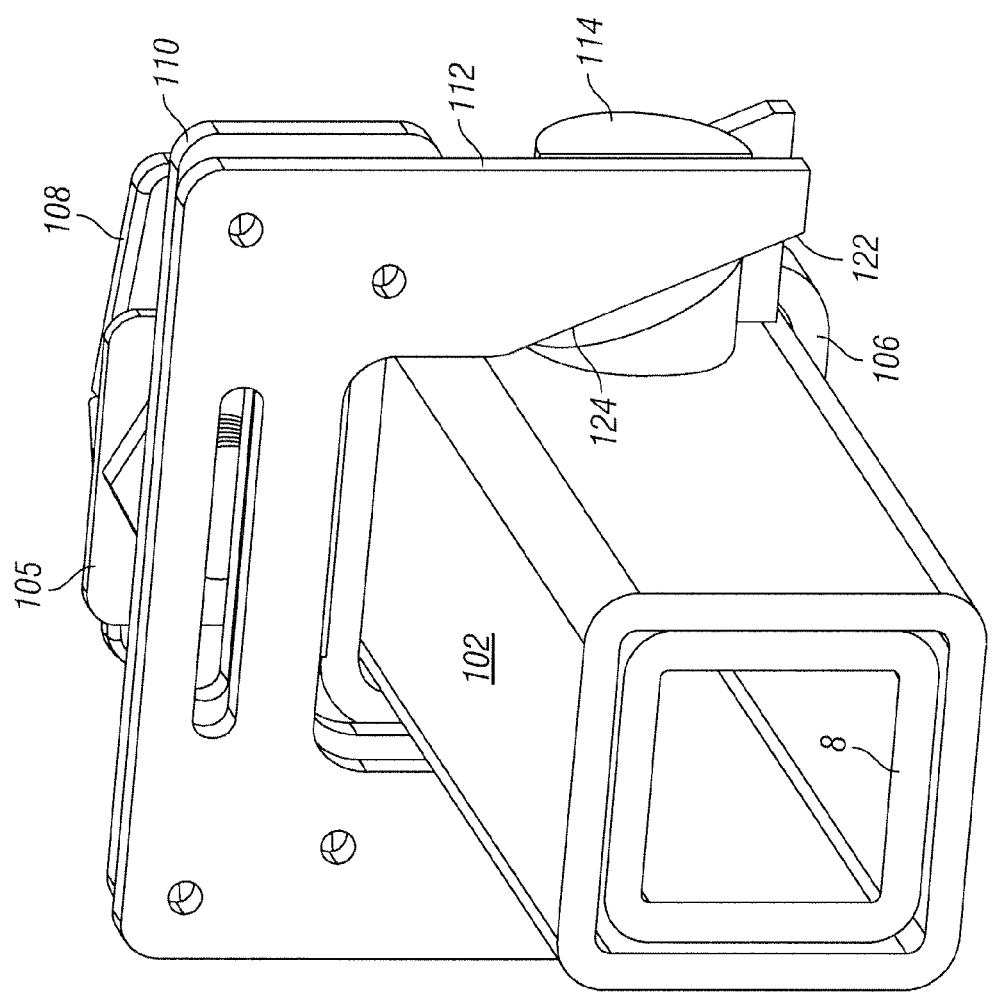
FIG. 17 is a rear perspective view of the example hitch assembly shown in FIG. 14 in a closed position with the handle removed for clarity.
Figure 19:
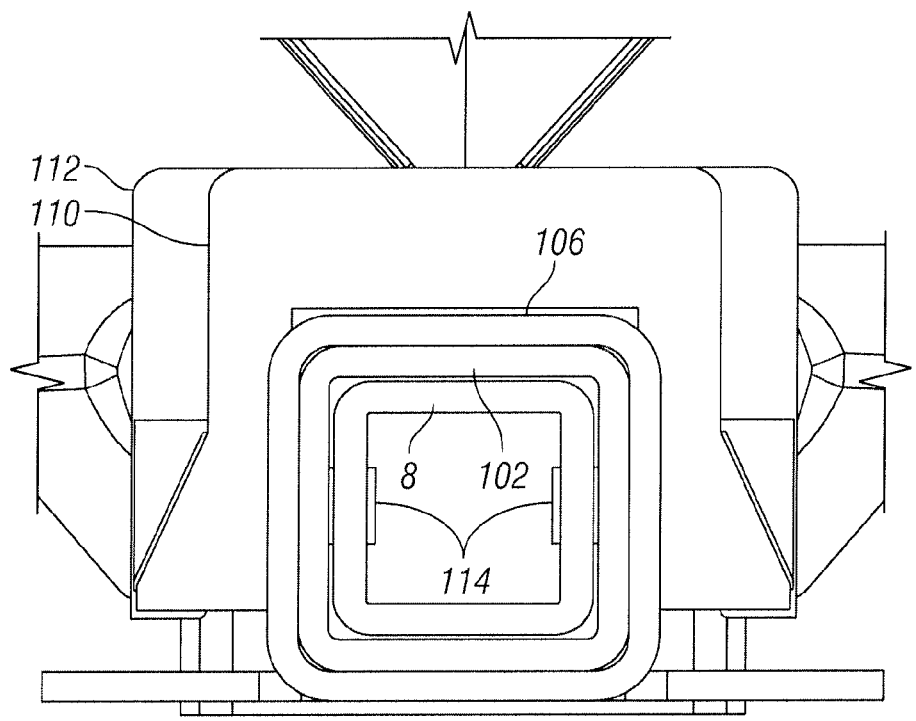
FIG. 19 is a front view of the example hitch assembly shown in FIG. 14 in a closed position with the handle removed for clarity.

FIGS. 17 and 19 show the example hitch assembly 100 in a closed position in which the drawbar 8 is secured within the receiver 102 via the pins 114 engaging the holes 9 in the drawbar 8. As discussed above, in this embodiment, the hitch assembly 100 is in an open position when the plates 112 are in are moved vertically (downward in this example) so that the closing cam surface 122 on the second plate 112 acts on the surface 124 on the second side (rear side in this example) of pins 114 to cause inward movement of pins 114 to engage the holes 9 in the drawbar 8.

During operation of the hitch assembly 100, the user would move the handle 108 to cause vertical movement (upward in this example) of the plates 110, 112. This causes the opening cam surface 118 on the first plate 110 to move pins 114 in an outward direction so the drawbar 8 may be inserted into the receiver 102. Once the drawbar 8 is inserted into the receiver 102, the handle 108 may be moved to cause vertical movement (downward in this example) of the plates 110, 112. This causes the closing cam surface 122 on the second plate 112 to move pins 114 in an inward direction to engage the holes 9 in the drawbar 8.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:
1. A bumper assembly comprising:
a bumper beam for an automotive vehicle;
a bumper fascia configured to cover the bumper beam;
a hitch assembly attached to the bumper beam, wherein the hitch assembly comprises:
    a body extending through the bumper fascia and dimensioned to receive a drawbar;
    at least one pin movable between an engaged position that secures the drawbar to the hitch assembly and a disengaged position that allows the drawbar to be released from the hitch assembly;
    a handle extending from the bumper fascia and adapted to move the pin between the engaged position and the disengaged position; and
    wherein the body includes a cam surface that moves the pin between the engaged position and the disengaged position.

2. The bumper assembly as recited in claim 1, wherein the hitch assembly includes a receiver dimensioned to receive a drawbar, wherein the pin extends through the receiver in the engaged position.

3. The bumper assembly as recited in claim 1, wherein the pin moves laterally between the engaged position and the disengaged position.

4. A hitch assembly for attachment to a bumper beam that is concealed with a bumper fascia, wherein the hitch assembly comprises:
a body extending through the bumper fascia and including a receiver dimensioned to receive a drawbar;
at least one pin movable between an engaged position that secures the drawbar to the hitch assembly and a disengaged position that allows the drawbar to be released from the hitch assembly;
a handle extending from the bumper fascia and adapted to move the pin between the engaged position and the disengaged position and
wherein the body includes a cam surface that moves the pin between the engaged position and the disengaged position.

5. The hitch assembly as recited in claim 4, wherein the pin extends through the receiver in the engaged position.

6. The hitch assembly as recited in claim 4, wherein the pin moves laterally between the engaged position and the disengaged position.

7. The hitch assembly as recited in claim 4, further comprising a biasing member urging the pin toward the engaged position.

8. A hitch assembly for attachment to a bumper beam that is concealed with a bumper fascia, wherein the hitch assembly comprises:
a body extending through the bumper fascia and including a receiver dimensioned to receive a drawbar;
at least one pin movable between an engaged position that secures the drawbar to the hitch assembly and a disengaged position that allows the drawbar to be released from the hitch assembly;
a handle extending from the bumper fascia and adapted to move the pin between the engaged position and the disengaged position; and
wherein the receiver defines openings in opposing sidewalls, further comprising a first pin and a second pin moveable in and out of registry with the openings in the opposing sidewalls of the receiver.

9. The hitch assembly as recited in claim 8, wherein the first pin and the second pin are substantially coplanar.

10. The hitch assembly as recited in claim 8, further comprising a first lever pivotable about a first bushing and a second lever pivotable about a second bushing, wherein the first lever moves the first pin in and out of registry with an opening in the sidewall of the receiver, wherein the second lever moves the second pin in and out of registry with an opposing opening in the sidewall of the receiver.

11. The hitch assembly as recited in claim 10, wherein the first lever includes a cam that is configured to engage a surface on the second lever, wherein the cam is configured to actuate rotation of the second lever about the second bushing when the first lever pivots about the first bushing.

12. The hitch assembly as recited in claim 11, further comprising a biasing member urging the first pin and the second pin out of registry with the openings in the sidewalls of the receiver.

13. The hitch assembly as recited in claim 12, wherein the handle is unitary with the first lever.

14. The hitch assembly as recited in claim 8, further comprising a first plate configured to move the first pin and the second pin out of registry with the openings in the sidewalls of the receiver.

15. The hitch assembly as recited in claim 14, wherein the first plate moves transversely with respect to the movement of the first pin and the second pin.

16. The hitch assembly as recited in claim 15, wherein the first pin and the second pin have a cam surface adapted to engage an edge of the first plate.

17. The hitch assembly as recited in claim 16, wherein the cam surface on the first pin is substantially symmetrical of the cam surface on the second pin.

18. The hitch assembly as recited in claim 14, further comprising a second plate configured to move the first pin and the second pin in registry with the openings in the sidewalls of the receiver.

19. The hitch assembly as recited in claim 18, wherein the first pin and the second pin have a cam surface adapted to engage an edge of the second plate.

20. The hitch assembly as recited in claim 18, wherein the first pin and the second pin have a first cam surface adapted to engage an edge of the first plate to move the first pin and the second pin out of registry with the openings in the side walls of the receiver, wherein the first pin and the second pin have a second cam surface adapted to engage an edge of the second plate to move the first pin and the second pin in registry with the openings in the side walls of the receiver.

21. The hitch assembly as recited in claim 20, wherein the first plate is coupled with the second plate.

22. The hitch assembly as recited in claim 21, wherein the first plate and the second plate are approximately parallel to each other.

23. The hitch assembly as recited in claim 21, wherein the movement of the first plate and the second plate in a first direction moves the first pin and the second pin out of registry with the openings in the sidewalls of the receiver.

24. The hitch assembly as recited in claim 23, wherein movement of the first plate and the second plate in a second direction moves the first pin and the second pin in registry with the openings in the side walls of the receiver, wherein the second direction is in a substantially opposite direction of the first direction.

* * * * *